US009625691B2

(12) United States Patent
Hsu et al.

(10) Patent No.: US 9,625,691 B2
(45) Date of Patent: Apr. 18, 2017

(54) PROJECTION LENS

(75) Inventors: Ya-Ling Hsu, Hsinchu (TW); Yi-Hsueh Chen, Hsinchu (TW); Hsin-Hung Lin, Hsinchu (TW); Ching-Lun Lin, Hsinchu (TW); Wan-Chiang Wang, Hsinchu (TW); Chao-Shun Chen, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 306 days.

(21) Appl. No.: 13/589,187

(22) Filed: Aug. 20, 2012

(65) Prior Publication Data
US 2014/0049813 A1    Feb. 20, 2014

(51) Int. Cl.
*G02B 17/08* (2006.01)
*G02B 5/10* (2006.01)

(52) U.S. Cl.
CPC ............. *G02B 17/08* (2013.01); *G02B 5/10* (2013.01)

(58) Field of Classification Search
CPC ......... G02B 17/08; G02B 13/16; G02B 27/18
See application file for complete search history.

(56) References Cited

U.S. PATENT DOCUMENTS

| 4,427,274 | A   |   | 1/1984  | Pund et al. |
|-----------|-----|---|---------|-------------|
| 5,436,765 | A   | * | 7/1995  | Togino ........................... 359/631 |
| 5,477,394 | A   |   | 12/1995 | Shibazaki |
| 5,495,306 | A   |   | 2/1996  | Shibazaki |
| 6,631,994 | B2  |   | 10/2003 | Suzuki et al. |
| 6,896,375 | B2  |   | 5/2005  | Peterson et al. |
| 6,994,442 | B2  |   | 2/2006  | Kurematsu et al. |
| 7,009,765 | B2  |   | 3/2006  | Gohman |
| 7,150,537 | B2  |   | 12/2006 | Peterson et al. |
| 7,341,353 | B2  |   | 3/2008  | Peterson et al. |
| 7,545,586 | B2  |   | 6/2009  | Gohman |
| 7,567,380 | B2  |   | 7/2009  | Peterson et al. |
| 2007/0285811 | A1 | * | 12/2007 | Takahashi et al. ........... 359/868 |
| 2008/0068564 | A1 | * | 3/2008  | Abe et al. ........................ 353/98 |
| 2010/0039625 | A1 |   | 2/2010  | Takaura et al. |
| 2010/0172022 | A1 |   | 7/2010  | Lin et al. |
| 2010/0232038 | A1 | * | 9/2010  | Kang et al. .................... 359/717 |
| 2010/0232039 | A1 | * | 9/2010  | Chen et al. .................... 359/728 |
| 2011/0299049 | A1 | * | 12/2011 | Yatsu et al. ..................... 353/98 |

FOREIGN PATENT DOCUMENTS

TW            436661          5/2001

* cited by examiner

*Primary Examiner* — Scott J Sugarman
*Assistant Examiner* — Robert E Tallman
(74) *Attorney, Agent, or Firm* — Jiang Chyun IP Office

(57) ABSTRACT

A projection lens configured to form an image from an image source which is disposed at an object side is provided. The projection lens includes a lens group and an aspheric mirror. The lens group has a first optical axis, and an intermediate image is formed by the lens group from the image source. The aspheric mirror has a second optical axis and an aspheric surface. The lens group is disposed between the object side and the aspheric mirror. The aspheric surface faces the lens group and reflects the intermediate image to form the image at an image side. The first optical axis is not coaxial with the second optical axis, and an offset of the image relative to the first optical axis is larger than or equal to 100%.

27 Claims, 5 Drawing Sheets

PROJECTION LENS

BACKGROUND OF THE INVENTION

Field of the Invention

The invention relates to a lens, and more particularly to a projection lens.

Description of Related Art

Along with the development of the displaying technology, projectors are widely applied in different occasions, such as the conference or the office meeting. Mostly, the projectors are used for image displaying or video playing. An important feature for the projector is that the image can be enlarged and presented on the screen. However, the distance between the projector and the screen is required to be small enough to prevent waste of space. Therefore, a projection lens employed in the projector has to be capable of providing a large image within a limited range.

To design a projection lens for wide angle display, the aberrations such as distortion, field curvature or astigmatism should be taken into account. Several methods are already proposed to lower the aberration effects such as extending the length of the projection lens, employing the combination of spherical lenses and aspheric lenses for the projection lens or increasing the number of lens. However, those methods also increase the difficulty of designing each element in the projection lens. Therefore, how to provide a projection lens which can be easily designed for wide angle display with low aberration effect is still a main topic for research and development.

In the known art, a variety of methods to improve the imaging quality of the wide-angle projection lens are disclosed. U.S. Pat. No. 7,009,765 uses a secondary imaging principle to produce an intermediate image, thereby reduce the aberration problem. U.S. Pat. Nos. 5,477,394 and 6,994,442 disclose a scheme that by using a plurality of reflectors to shorten the projection distance. U.S. Pat. Nos. 6,896,375, 7,341,353, 7,545,586 and 7,567,380 use multiple reflectors to shorten the focal length. U.S. Pat. No. 7,150,537 and U.S. Patent Application No. 20100172022A1 use positive-negative distortions complementary principle of two groups of lenses to correct the aberration. U.S. Pat. Nos. 4,427,274 and 5,495,306 propose a projection lens. U.S. Pat. No. 6,631,994 discloses a refracting optical lens to correct for pincushion distortion of the convex mirror. U.S. Patent Application No. 20100039625 discloses a projection optical system for use in an image projection apparatus. In addition, Taiwan Patent No. 436661 discloses a curved surface reflective-type projection structure of digital projector.

SUMMARY OF THE INVENTION

The invention is directed to a projection lens, and the projection lens is capable of providing large images within a limited range for wide angle view, and has low cost and good optical quality.

An embodiment of the invention provides a projection lens configured to form an image from an image source which is disposed at an object side. The projection lens includes a lens group and an aspheric mirror. The lens group has a first optical axis, and an intermediate image is formed by the lens group from the image source. The aspheric mirror has a second optical axis and an aspheric surface, and the lens group is disposed between the object side and the aspheric mirror. The aspheric surface faces the lens group and reflects the intermediate image to form the image at an image side. The first optical axis is not coaxial with the second optical axis, and an offset of the image relative to the first optical axis is larger than or equal to 100%.

An embodiment of the invention provides a projection lens configured to form an image from an image source which is disposed at an object side. The projection lens includes a lens group having a first optical axis and an aspheric mirror having a second optical axis. The aspheric mirror also includes an aspheric surface. The lens group is disposed between the object side and the aspheric mirror, and the aspheric surface faces the lens group in order to form the image at an image side. The first optical axis is not coaxial with the second optical axis, and a degree of an aspheric formula of the aspheric surface of the aspheric mirror is less than or equal to 8.

Based on the above description, according to the exemplary embodiments of the invention, the projection lens includes the lens group and the aspheric mirror. The first optical axis of the lens group is not coaxial with the second optical axis of the aspheric mirror. Therefore, the image formed by the projection lens may be enlarged within a short range, and high quality of the image and low cost of the projection lens may be achieved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
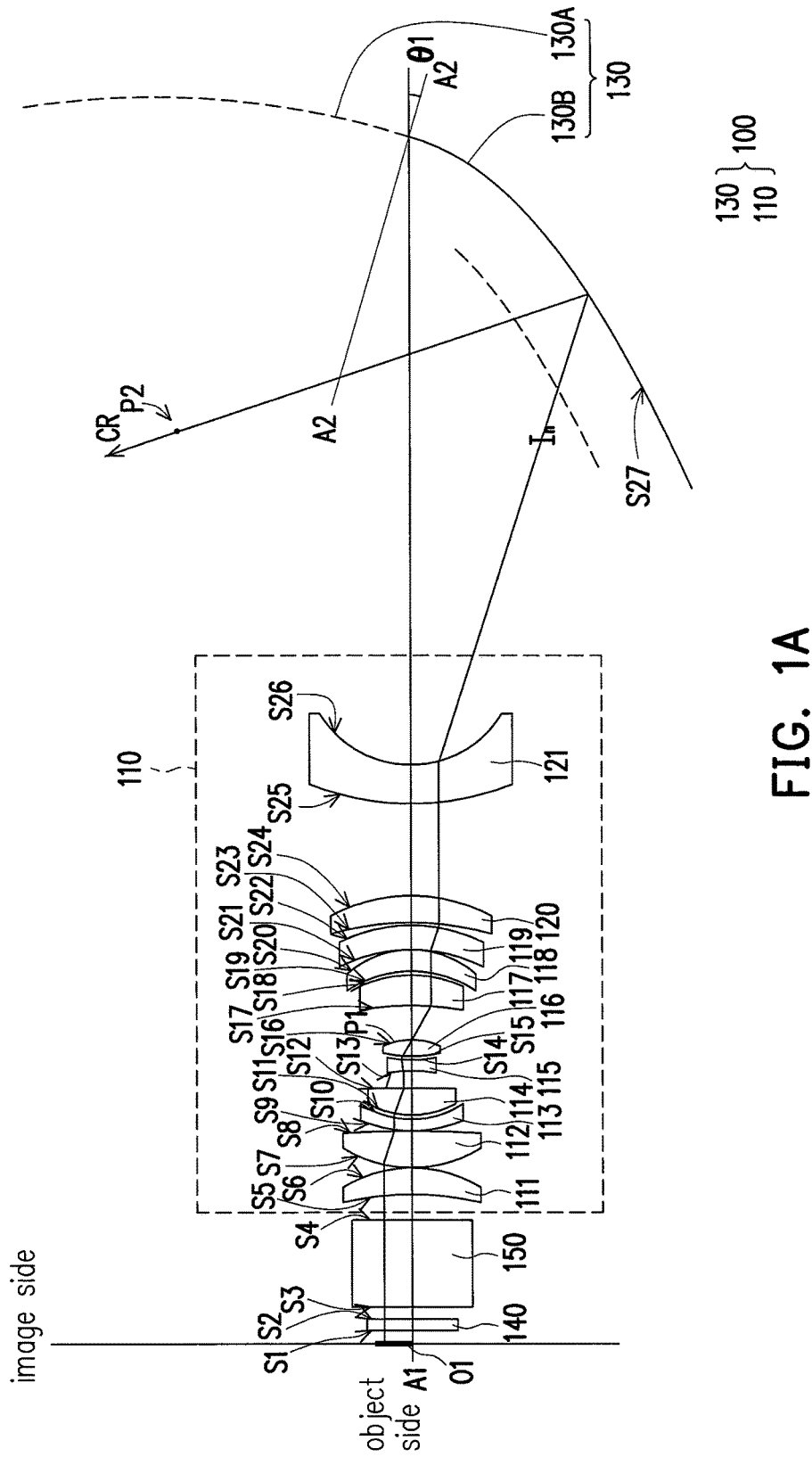
FIG. 1A is a schematic structural diagram of a projection lens according to an embodiment of the invention.
Figure 1B:
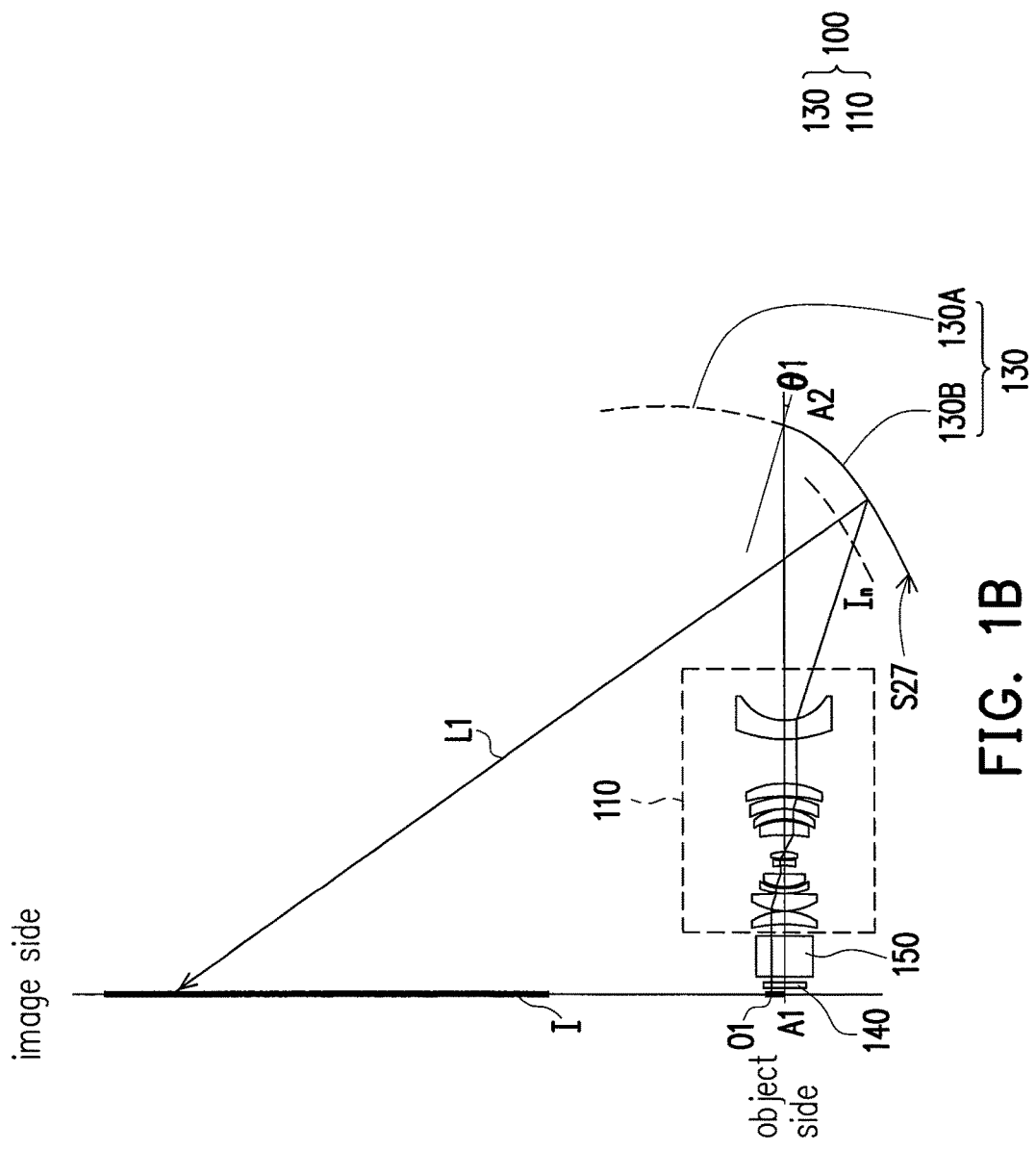
FIG. 1B is a schematic diagram of a projection lens according to another embodiment of the invention.

FIG. 1A is a schematic structural diagram of a projection lens according to an embodiment of the invention, and FIG. 1B is a schematic diagram of the projection lens according to the embodiment of the invention. Referring to FIG. 1A and FIG. 1B, the projection lens 100 configured to form an image I from an image source O1 disposed at an object side includes a lens group 110 and an aspheric mirror 130. The lens group 110 has a first optical axis A1, and the aspheric mirror 130 has a second optical axis A2 and an aspheric surface S27. In addition, the lens group 110 is disposed between the object side and the aspheric mirror 130, and the aspheric surface S27 faces the lens group 110. For example, the aspheric surface S27 of the aspheric mirror 130 is a concave surface facing the object side. In this embodiment, an intermediate image In is formed by the lens group 110 from the image source O1. Specifically, the intermediate image In and the image source O1 are at opposite sides of the first optical axis A1. In addition, the intermediate image In is between the lens group 110 and the aspheric mirror 130. The aspheric mirror 130 reflects the intermediate image In to form the image I at an image side. Referring to FIG. 1B, the intermediate image In is reflected by the aspheric mirror 130, and the image I is formed at the image side. A light beam L1 is illustrated to show one of the light paths. Furthermore, the first optical axis A1 of the lens group 110 is not coaxial with the second optical axis A2 of the aspheric mirror 130, and an offset of the image I relative to the first optical axis A1 is larger than or equal to 100%.

Figure 1C:
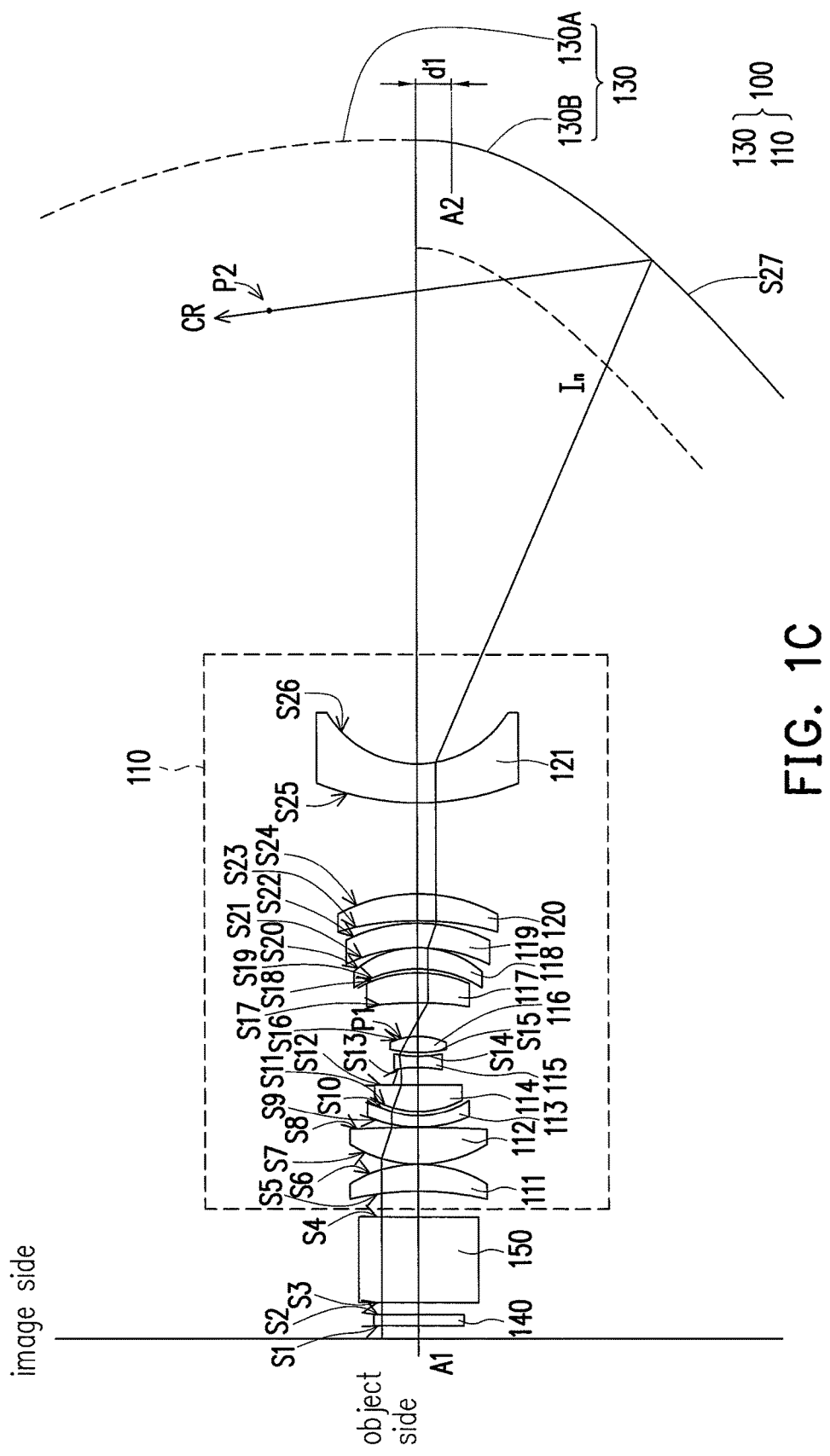
FIG. 1C is a schematic structural diagram of a projection lens according to another embodiment of the invention.
Figure 1D:
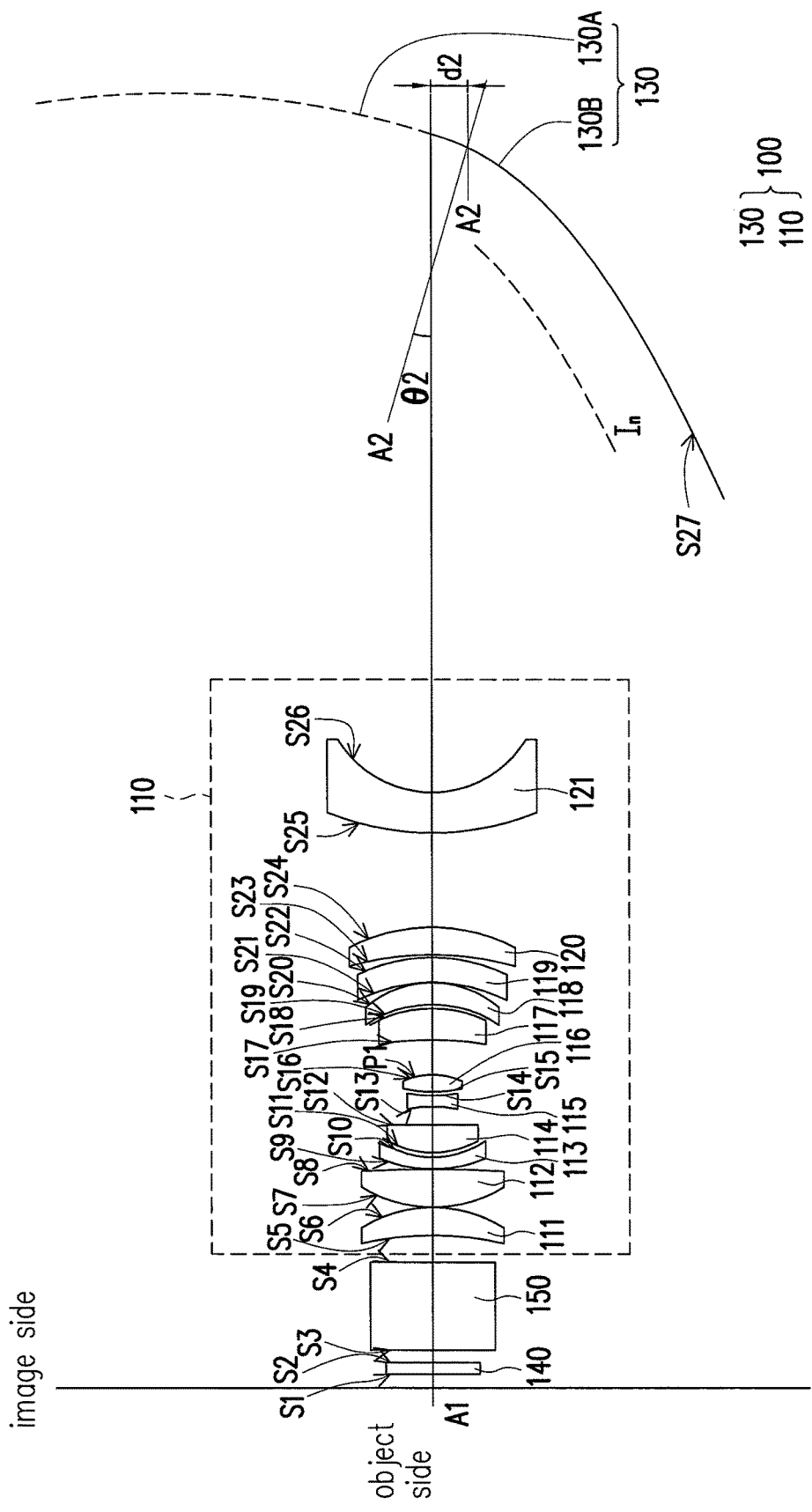
FIG. 1D is a schematic structural diagram of a projection lens according to another embodiment of the invention.

To be more specific, according to the embodiment of the invention, the second optical axis A2 is tilted with respect to the first optical axis A1, so the first optical axis A1 is not coaxial with the second optical axis A2. Therefore, a tilt angle $\theta_1$ is between the first optical axis A1 and the second optical axis A2. However, the invention is not limited thereto. FIG. 1C is a schematic structural diagram of a projection lens according to another embodiment of the invention. Referring to 1C, the second optical axis A2 of the aspheric mirror 130 is decentered with the respect to the first optical axis A1. A decenter distance $d_1$ is between the first optical axis A1 and the second optical axis A2. FIG. 1D is a schematic structural diagram of a projection lens according to another embodiment of the invention. Referring to 1D, the second optical axis A2 of the aspheric mirror 130 is decentered and tilted with the respect to the first optical axis A1. The decenter distance $d_2$ and the tilt angle $\theta_2$ are between the first optical axis A1 and the second optical axis A2.

By tilting or/and decentering the first optical axis A1 and the second optical axis A2, the offset of the image I formed by the projection lens 100 is smaller than or equal to 105%. The offset of the image I can be obtained from the following formula:

$$\text{Offset}(\%) = \frac{I_H + I_D}{I_H}$$

The $I_H$ is the image height, and the $I_D$ is the distance between the image and the relative optical axis (i.e. the first optical axis A1).

In this embodiment, the offset of the image I relative to the first optical axis A1 and an offset of the image source O1 relative to the first optical axis are towards a substantially same direction. The offset of the image source O1 can also be defined by the above formula, but the image height is replaced by an object height (i.e. the height of the image source O1), and the distance between the image I and the relative optical axis is replaced by the distance between the object (i.e. the image source O1) and the relative optical axis (i.e. the first optical axis). Furthermore, the aspheric mirror 130 is employed to reflect the intermediate image In formed by the lens group 110 to the image side in order to form the image I, so that the image side where the image I is located and the object side are at the same side of the lens group 110.

Referring to FIG. 1A again, since the second optical axis A2 of the aspheric mirror 130 is not coaxial with the first optical axis A1 of the lens group 110, the projection lens 100 may use aspheric surface of the aspheric mirror 130 with the degree of an aspheric formula less than or equal to 8. In addition, the lens group 110 includes at least one spherical lens and at least one aspheric lens. Accordingly, the at least one aspheric lens has at least one aspheric surface, and the degree of the aspheric formula of the at least one aspheric surface of the at least one aspheric lens is less than or equal to 8. The detail design of the aspheric surfaces is described at the following embodiment.

Referring to FIG. 1A, in an embodiment of the invention, the image source O1 is, for example, a light valve. In this embodiment, the light valve is, for example, a digital micromirror device (DMD). However, in another embodiment, the light valve may be a liquid-crystal-on-silicon panel. In addition, a total internal reflection prism 150 may be disposed between the image source O1 and the lens group 110, and a cover glass 140 may be disposed between the image source O1 and the total internal reflection prism 150. A chief ray CR is illustrated to show one of the light paths in the projection lens 100. The lens group 110 includes at least one spherical lens and at least one aspheric lens. Moreover, the lens group 110 includes a first pupil P1, and the aspheric mirror 130 forms a second pupil P2 between the aspheric mirror 130 and the image I at the image side. The second pupil P2 is formed on the path of the chief ray CR.

As shown in FIG. 1A, although the aspheric mirror 130 is described to has the second optical axis A2, the aspheric mirror 130 only uses the lower part 130B (with respect to the first optical axis A1 in FIG. 1A). Therefore, the upper part 130A of the aspheric mirror 130 in FIG. 1A could be removed due to the design. The same deduction could be made for the aspheric mirror 130 in FIG. 1B, FIG. 1C, FIG. 1D and FIG. 1E. Moreover, according to the embodiment of the FIG. 1B, the intermediate image In and the image I formed at the image side are at the opposite sides of the first optical axis A1. In other words, the offsets of the intermediate image In and the image I with respect to the first optical axis A1 are towards the different directions. From the above description, since the offset of the image I relative to the first optical axis A1 and the offset of the image source O1 relative to the first optical axis A1 are towards a substantially same direction, the image source O1 and the image I are at the same side of the first optical axis A1. Furthermore, the projection lens 100 could be designed as a telecentric optical lens or a non-telecentric optical lens.

In one embodiment of the invention, in FIG. 1A, the projection lens 100 includes a first lens 111, a second lens 112, a third lens 113, a fourth lens 114, a fifth lens 115, a sixth lens 116, a seventh lens 117, an eighth lens 118, a ninth lens 119, a tenth lens 120 and an eleventh lens 121 arranged in sequence from the object side towards the aspheric mirror 130. The refractive powers of the first lens 111, the second lens 112, third lens 113, the fourth lens 114, the fifth lens 115, the sixth lens 116, the seventh lens 117, the eighth lens 118, the ninth lens 119, the tenth lens 120 and the eleventh lens 121 are respectively positive, positive, negative, positive, negative, positive, positive, positive, positive, positive, and negative.

Figure 1E:
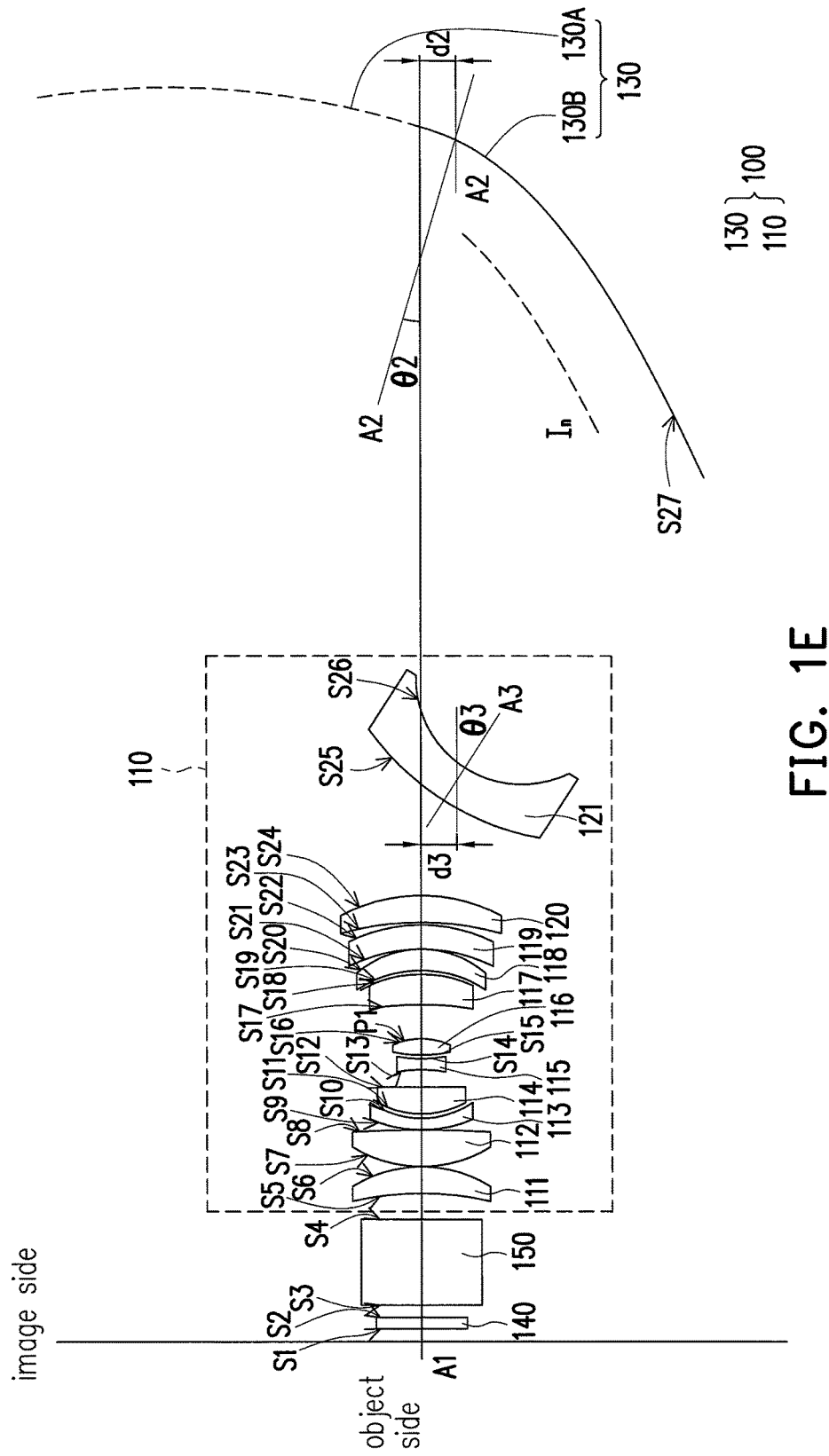
FIG. 1E is a schematic structural diagram of a projection lens according to another embodiment of the invention.

Further, according to an embodiment, the lens group includes an aspheric lens having a third optical axis. The third optical axis of the aspheric lens is not coaxial with the first optical axis. Referring to FIG. 1E, is a schematic structural diagram of a projection lens according to one embodiment of the invention. In the embodiment, the eleventh lens 121 has the third optical axis A3, and the third optical axis A3 is not coaxial with the first optical axis A1. Moreover, the third optical axis A3 is tilted and decentered with respect to the first optical axis A1. As the result, the tilt angle $\theta_3$ and the decenter distance $d_3$ are between the first optical axis A1 and the third optical axis A3. In another embodiment, the third optical axis A3 may be tilted but not decentered with respect to the first optical axis A1. Alternatively, the third optical axis A3 may be decentered but not tilted with respect to the first optical A1.

An embodiment of the projection lens 100 is provided below. It should be noticed that data listed in following table 1 and table 2 are not used to limit the invention, and those skilled in the art can suitably change the parameters or settings therein after referring to the invention without departing from the scope of the invention.

TABLE 1

| Surface | Radius of Curvature (mm) | Interval (mm) | Lens material | Conic constant | Notes |
|---|---|---|---|---|---|
| S1 | Infinity | 1.05 | BK1 | | Cover glass |
| S2 | Infinity | 2.4 | | | |
| S3 | Infinity | 19.04106 | S-BSL7 | | Total internal reflective prism |
| S4 | Infinity | 5.12644 | | | |
| S5 | −156.9829 | 6.171482 | SF57 | | First lens |
| S6 | −33.74996 | 0.3 | | | |
| S7 | 20.43806 | 7.892556 | FPL51 | | Second lens |
| S8 | 114.6511 | 0.3 | | | |
| S9 | 21.57375 | 2.211225 | N-LASF9 | | Third lens |
| S10 | 13.61225 | 0.4056373 | | | |
| S11 | 13.71574 | 6.748842 | FPL51 | | Fourth lens |
| S12 | −367.1741 | 3.353096 | | | |
| S13 | −29.79095 | 2.094894 | PBH56 | | Fifth lens |
| S14 | 16.86163 | 0.4695822 | | | |
| S15 | 21.92253 | 3.661067 | FPL51 | | Sixth lens |
| S16 | −145.7242 | 9.012536 | | | |
| S17 | −48.3363 | 6.447906 | PSK50 | | Seventh lens |
| S18 | −21.14756 | 0.8074614 | | | |
| S19 | −24.79296 | 5.624951 | F7 | | Eighth lens |
| S20 | −21.07151 | 0.8529586 | | | |
| S21 | −79.77044 | 5.581169 | 480R | 11.28466 | Ninth lens |
| S22 | −44.72693 | 2.128666 | | −11.2506 | |
| S23 | −53.24899 | 7.798873 | BAH22 | | Tenth lens |
| S24 | −28.95493 | 16.32272 | | | |
| S25 | 167.5879 | 6.966617 | 480R | 20.30608 | Eleven lens |
| S26 | 13.84492 | 200.4495 | | −2.03899 | |
| S27 | −46.12047 | −331.765 | MIRROR | −2.15581 | Aspheric mirror |

In Table 1, the interval refers to a linear distance along the first optical axis A1 between two neighboring surfaces. For example, the interval of surface S3 is the linear distance along the first optical axis A1 between surface S3 and surface S4. It should be noted that, although the second optical axis A2 of the aspheric mirror 130 is not coaxial with the first optical axis A1 of the lens group 110, the interval between the surface S26 and the surface S27 of the aspheric mirror 130 is computed under the condition that the aspheric mirror 130 is assumed to be disposed along the first optical axis A1 and before being tilted or decentered. The codes in the column of the lens material represent the materials of the lens. The interval, radius of curvature, and lens material corresponding to each of the lenses listed in the "Notes" column can be found in the corresponding values for the interval, radius of curvature, and lens material from each row.

Moreover, in Table 1, surfaces S1 and S2 are two surfaces of the cover glass 140, surfaces S3 and S4 are two surfaces of the total internal reflective prism 150, surfaces S5 and S6 are two surfaces of the first lens 111, surfaces S7 and S8 are two surfaces of the second lens 112, surfaces S9 and S10 are two surfaces of the third lens 113, surfaces S11 and S12 are two surfaces of the fourth lens 114, surfaces S13 and S14 are two surfaces of the fifth lens 115, surfaces S15 and S16 are two surfaces of the sixth lens 116, surfaces S17 and S18 are two surfaces of the seventh lens 117, surfaces S19 and S20 are two surfaces of the eighth lens 118, surfaces S21 and S22 are two surfaces of the ninth lens 119, surfaces S23 and S24 are two surfaces of the tenth lens 120, surfaces S25 and S26 are two surfaces of the eleventh lens 121, and the surface S27 is a surface of the aspheric mirror 130.

According to the Table 1, from the radius of curvature of each surfaces, it can be deduced that the first lens 111 is a concave-convex lens with a concave surface S5 facing the object side, the second lens 112 is a concave-convex lens with a convex surface S7 facing the object side, the third lens 113 is a convex-concave lens with a convex surface S9 facing the object side, the fourth lens 114 is a biconvex lens, the fifth lens 115 is a biconcave lens, the sixth lens 116 is a biconvex lens, the seventh lens 117 is a concave-convex lens with a concave surface S17 facing the object side, the eighth lens 118 is a concave-convex lens with a concave surface S19 facing the object side, the ninth lens 119 is a concave-convex lens with a concave surface S21 facing the object side, the tenth lens 120 is a concave-convex lens with a concave surface S23 facing the object side and the eleventh lens 121 is a convex-concave lens with a convex surface S25 facing the object side. In addition, the first pupil P1 is located at the surface 16 of the sixth lens 116.

The radius of curvature, the interval, and other parameters are shown in Table 1, so they are not further described herein. As shown in Table 1, the design of the projection lens 100 fully satisfies the conditions mentioned above. Moreover, in the embodiment, the ninth lens 119 and the eleventh lens 121 are the aspheric lenses, so the surfaces S21, S22, S25 and S26 are the aspheric surfaces. Further, the aspheric mirror 130 is a concave mirror with the aspheric surface S27 facing to the lens group 110.

The above surfaces S21, S22, S25, S26 and S27 are aspheric surfaces with even power, and are expressed by the following aspheric formula:

$$Z(r) = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, $Z(r)$ is a sag of the displacement of the surface from the vertex or the related perpendicular line in the direction of the first optical axis A1, and c is the inverse of the radius of an osculating sphere, i.e. the inverse of the radius of curvature (e.g., the radius of curvatures of surfaces S21, S22, S25, S26 and S27 in the Table 1) close to the first optical axis A1. k is a conic coefficient, r is a height of an aspheric surface, i.e. a height from a center to an edge of a lens, and $\alpha_1$-$\alpha_8$ are aspheric coefficients. Parameters $\alpha_1$-$\alpha_4$ of the surfaces S21, S22, S25, S26 and S27 are listed in a Table 2, and parameters $\alpha_5$-$\alpha_8$ of the surfaces S21, S22, S25, S26 and S27 are all zero in accordance with the previous description that the degree of the aspheric formula of the aspheric surfaces of the aspheric lenses is less than or equal to 8. Since the first optical axis A1 of the lens group 110 is not coaxial with the second optical axis A2 of the aspheric mirror 130, the projection lens 100 use aspheric surface (i.e. S21, S22, S25, S26, S27) with the degree of an aspheric formula less than or equal to 8, which facilitates the production of the aspheric lens or aspheric mirror, and reduces the cost of the projection lens. It should be noted that, in another embodiment, the above aspheric surfaces S21, S22, S25, S26 and S27 are aspheric surfaces of the aspheric formula with odd power.

TABLE 2

| Aspheric Surface Parameter | Coefficient $\alpha_1$ | Coefficient $\alpha_2$ | Coefficient $\alpha_3$ | Coefficient $\alpha_4$ |
|---|---|---|---|---|
| S21 | 0 | −9.19E−06 | 9.64E−09 | 6.47E−11 |
| S22 | 0 | 2.18E−07 | 4.03E−08 | −1.28E−11 |
| S25 | 0 | 9.70E−06 | −1.16E−10 | −3.94E−12 |
| S26 | 0 | −1.31E−07 | 2.66E−09 | 3.17E−12 |
| S27 | 0 | −3.47E−07 | 2.91E−11 | −2.69E−15 |

According to the embodiment, the projection lens includes the previous described features. The first optical axis and the second optical of the projection lens are not coaxial. The degree of an aspheric formula of the aspheric surfaces of the aspheric lenses and the aspheric mirror is less or equal to 8. In addition, the intermediate image is formed by the lens group, and the aspheric mirror reflects the intermediate image to form the image at the image side. The offset of the image relative to the first optical axis is larger than or equal to 100%.

In summary, according to the exemplary embodiments of the invention, the projection lens provided in the previous embodiment is a wide-angle projection lens capable of providing image in limited range. Since the first optical axis of the lens group is not coaxial with the second optical axis of the aspheric mirror, the effect of the aberrations such as distortion, field curvature or astigmatism could be lowered by adjusting the decenter distance and the tilt angle of the second optical axis of the aspheric mirror. Moreover, since the first optical axis of the lens group is not coaxial with the second optical axis of the aspheric mirror, the projection lens of the embodiments of the invention may use aspheric surface with the degree of an aspheric formula less than or equal to 8, which facilitates the production of the aspheric lens or aspheric mirror, and reduces the cost of the projection lens. In addition, the offset of the image formed by the projection lens is smaller than or equal to 105% because the first optical axis is not coaxial with the second optical axis. As the result, the quality of image is improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims. Additionally, these claims may refer to use "first", "second", etc. following with noun or element. Such terms should be understood as a nomenclature and should not be construed as giving the limitation on the number of the elements modified by such nomenclature unless specific number has been given.

What is claimed is:

1. A projection lens configured to form a real image from an image source disposed at an object side, the projection lens comprising:
a lens group, having a first optical axis, wherein an intermediate image is formed by the lens group from the image source, the lens group comprises an aspheric lens, and a third optical axis of the aspheric lens is not coaxial with the first optical axis of the lens group; and
an aspheric mirror, having a second optical axis and an aspheric surface, wherein the lens group is disposed between the object side and the aspheric mirror, the aspheric surface faces the lens group and reflects the intermediate image to form the real image of the image source at an image side, and the real image is a magnified real image of the intermediate image,
wherein the first optical axis is not coaxial with the second optical axis, and a light ray transmitted along and on the first optical axis is not transmitted along and on the second optical axis.

2. The projection lens as claimed in claim 1, wherein an offset of the real image relative to the first optical axis is smaller than or equal to 105%, wherein the offset is obtained by a following formula:

$$\text{Offset} = \frac{I_H + I_D}{I_H} \times 100\%,$$

where $I_H$ is an image height of the real image, $I_D$ is a distance between the real image and the first optical axis, and the aspheric mirror is located on the first optical axis.

3. The projection lens as claimed in claim 1, wherein the second optical axis is tilted with respect to the first optical axis.

4. The projection lens as claimed in claim 1, wherein the second optical axis is parallel to but does not coincide with the first optical axis.

5. The projection lens as claimed in claim 1, wherein the lens group comprises a first pupil, and the aspheric mirror forms a second pupil between the aspheric mirror and the real image.

6. The projection lens as claimed in claim 1, wherein the lens group comprises a first lens, a second lens, a third lens, a fourth lens, a fifth lens, a sixth lens, a seventh lens, an eighth lens, a ninth lens, a tenth lens and an eleventh lens arranged in sequence from the object side towards the aspheric mirror, and refractive powers of the first lens, the second lens, the third lens, the fourth lens, the fifth lens, the sixth lens, the seventh lens, the eighth lens, the ninth lens, the tenth lens and the eleventh lens are respectively positive, positive, negative, positive, negative, positive, positive, positive, positive, positive and negative.

7. The projection lens as claimed in claim 6, wherein the first lens is a concave-convex lens with a concave surface facing the object side, the second lens is a concave-convex lens with a convex surface facing the object side, the third lens is a convex-concave lens with a convex surface facing the object side, the fourth lens is a biconvex lens, the fifth lens is a biconcave lens, the sixth lens is a biconvex lens, the seventh lens is a concave-convex lens with a concave surface facing the object side, the eighth lens is a concave-convex lens with a concave surface facing the object side, the ninth lens is a concave-convex lens with a concave surface facing the object side, the tenth lens is a concave-convex lens with a concave surface facing the object side, and the eleventh lens is a convex-concave lens with a convex surface facing the object side.

8. The projection lens as claimed in claim 6, wherein the ninth lens and the eleventh lens are the aspheric lenses.

9. The projection lens as claimed in claim 1, wherein the aspheric mirror is a concave mirror with the aspheric surface facing to the lens group.

10. The projection lens as claimed in claim 1, wherein an offset of the image source relative to the first optical axis and the offset of the real image relative to the first optical axis are towards a substantially same direction, and the image side and the object side are at the same side of the lens group.

11. The projection lens as claimed in claim 1, wherein the intermediate image and the image source are at the opposite side of the first optical axis.

12. A projection lens configured to form an image from an image source disposed at an object side, the projection lens comprising:
a lens group, having a first optical axis; and
an aspheric mirror, having a second optical axis and an aspheric surface, wherein the lens group is disposed between the object side and the aspheric mirror, and the aspheric surface faces the lens group to form the image at an image side,
wherein the first optical axis is not coaxial with the second optical axis, a degree of a polynomial of an aspheric formula of the aspheric surface of the aspheric mirror is less than or equal to 8, and wherein an intermediate image is formed by the lens group from the image source, the intermediate image is reflected by the aspheric mirror to form the image at the image side, and an offset of the image relative to the first optical axis is smaller than or equal to 105%, wherein the offset is obtained by a following formula:

$$\text{Offset} = \frac{I_H + I_D}{I_H} \times 100\%,$$

where $I_H$ is an image height of the image, $I_D$ is a distance between the image and the first optical axis, and the aspheric mirror is located on the first optical axis.

13. The projection lens as claimed in claim 12, wherein the lens group comprises at least one spherical lens and at least one aspheric lens.

14. The projection lens as claimed in claim 13, wherein the at least one aspheric lens has at least one aspheric surface, and a degree of a polynomial of an aspheric formula of the at least one aspheric surface of the at least one aspheric lens is less than or equal to 8.

15. The projection lens as claimed in claim 12, wherein the second optical axis is tilted with respect to the first optical axis.

16. The projection lens as claimed in claim 12, wherein the second optical axis is parallel to but does not coincide with the first optical axis.

17. The projection lens as claimed in claim 12, wherein the lens group comprises a first pupil, and the aspheric mirror forms a second pupil between the aspheric mirror and the image.

18. The projection lens as claimed in claim 12, wherein the lens group comprises an aspheric lens, and a third optical axis of the aspheric lens is not coaxial with the first optical axis of the lens group.

19. The projection lens as claimed in claim 12, wherein the lens group comprises a first lens, a second lens, a third lens, a fourth lens, a fifth lens, a sixth lens, a seventh lens, an eighth lens, a ninth lens, a tenth lens and an eleventh lens arranged in sequence from the object side towards the aspheric mirror, and refractive powers of the first lens, the second lens, the third lens, the fourth lens, the fifth lens, the sixth lens, the seventh lens, the eighth lens, the ninth lens, the tenth lens and the eleventh lens are respectively positive, positive, negative, positive, negative, positive, positive, positive, positive, positive and negative.

20. The projection lens as claimed in claim 19, wherein the first lens is a concave-convex lens with a concave surface facing the object side, the second lens is a concave-convex lens with a convex surface facing the object side, the third lens is a convex-concave lens with a convex surface facing the object side, the fourth lens is a biconvex lens, the fifth lens is a biconcave lens, the sixth lens is a biconvex lens, the seventh lens is a concave-convex lens with a concave surface facing the object side, the eighth lens is a concave-convex lens with a concave surface facing the object side, the ninth lens is a concave-convex lens with a concave surface facing the object side, the tenth lens is a concave-convex lens with a concave surface facing the object side, and the eleventh lens is a convex-concave lens with a convex surface facing the object side.

21. The projection lens as claimed in claim 19, wherein the ninth lens and the eleventh lens are the aspheric lenses with the aspheric surfaces.

22. The projection lens as claimed in claim 12, wherein the aspheric mirror is a concave mirror with the aspheric surface facing to the lens group.

23. The projection lens as claimed in claim 12, wherein an offset of the image source relative to the first optical axis and the offset of the image relative to the first optical axis are towards a substantially same direction, and the image side and the object side are at the same side of the lens group.

24. The projection lens as claimed in claim 12, wherein the intermediate image and the image source are at the opposite side of the first optical axis.

25. A projection lens configured to form a real image from an image source disposed at an object side, the projection lens comprising:
  a lens group, having a first optical axis, wherein an intermediate image is formed by the lens group from the image source, the lens group comprises an aspheric lens, and a third optical axis of the aspheric lens is not coaxial with the first optical axis of the lens group; and
  an aspheric mirror, having a second optical axis and an aspheric surface, wherein the lens group is disposed between the object side and the aspheric mirror, the aspheric surface faces the lens group and reflects the intermediate image to form the real image of the image source at an image side, and the real image is a magnified real image of the intermediate image,
  wherein the first optical axis is parallel to but does not coincide with the second optical axis, or is tilted with respect to but not perpendicular to the second optical axis.

26. The projection lens as claimed in claim 1, wherein the second optical axis and the first optical axis are not a same optical axis.

27. The projection lens as claimed in claim 1, wherein the second optical axis is not a continuation of the first optical axis at the aspheric surface of the aspheric mirror.

* * * * *